(12) United States Patent
Kaguma et al.

(10) Patent No.: US 9,961,139 B2
(45) Date of Patent: May 1, 2018

(54) COOPERATIVE DOWNLOAD AMONG LOW-END DEVICES UNDER RESOURCE CONSTRAINED ENVIRONMENT

(71) Applicant: INTERNATIONAL BUSINESS MACHINES CORPORATION, Armonk, NY (US)

(72) Inventors: David W. Kaguma, Nairobi (KE); Samuel Karumba, Nairobi (KE); Komminist Weldemariam, Nairobi (KE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 158 days.

(21) Appl. No.: 15/162,924

(22) Filed: May 24, 2016

(65) Prior Publication Data

US 2017/0346887 A1    Nov. 30, 2017

(51) Int. Cl.
*H04L 29/08* (2006.01)
*G06F 15/173* (2006.01)

(52) U.S. Cl.
CPC ............ *H04L 67/104* (2013.01); *H04L 67/06* (2013.01)

(58) Field of Classification Search
USPC .................................. 709/206, 220–228, 238
See application file for complete search history.

(56) References Cited

U.S. PATENT DOCUMENTS

| 7,716,710 | B1 | 5/2010 | Everson et al. | |
|---|---|---|---|---|
| 8,250,191 | B2 | 8/2012 | Hickmott et al. | |
| 8,443,077 | B1* | 5/2013 | Lappas | G06F 9/5077 709/224 |
| 8,539,338 | B2 | 9/2013 | Zhu et al. | |
| 2007/0043771 | A1* | 2/2007 | Ludwig | H04L 61/1582 |
| 2008/0320097 | A1* | 12/2008 | Sawicki | G06F 3/0607 709/216 |
| 2009/0070482 | A1 | 3/2009 | Hickmott et al. | |
| 2010/0235641 | A1 | 9/2010 | Hickmott et al. | |
| 2013/0145105 | A1* | 6/2013 | Sawicki | G06F 3/0619 711/147 |

(Continued)

FOREIGN PATENT DOCUMENTS

| CN | 104158904 A | 11/2014 |
|---|---|---|
| WO | 2014037487 A1 | 3/2014 |

OTHER PUBLICATIONS

Perrucci, Gian Paolo, et al. "Cooperative web browsing for mobile phones." Proceedings of the International Symposium on Wireless Personal Multimedia Communications (WPMC'07). 2007. 5 pages.

(Continued)

*Primary Examiner* — Jude Jean Gilles
(74) *Attorney, Agent, or Firm* — Louis J. Percello; Otterstedt, Ellenbogen & Kammer, LLP

(57) ABSTRACT

The disclosure provides systems and methods for efficient arrangement, use, and management of networked electronic devices. The networked electronic devices are configured to form a peer-to-peer network, and to allocate management, download, and aggregation responsibilities among themselves to improve efficiency. Networking errors are minimized by replacing faulting nodes with idle nodes.

20 Claims, 5 Drawing Sheets

(56) References Cited

U.S. PATENT DOCUMENTS

2013/0151653 A1* 6/2013 Sawicki ............ G06F 15/17331
                                                                709/216
2013/0332621 A1   12/2013 Keller et al.
2014/0153438 A1*  6/2014 Mahasenan .......... G01S 5/0284
                                                                370/254

OTHER PUBLICATIONS

Ayush Dubey and Pradipta De: Co-operative Content Adaptation Framework 2 pages, WWW 2013 Companion, May 13-17, 2013, Rio de Janeiro, Brazil. ACM 978-1-4503-2038-2/13/05.

M. Sirivianos et al., 2007 USENIX Annual Technical Conference, Dandelion: Cooperative Content Distribution with Robust Incentives messages 2007: 25 pages.

Kaplan, Ali, Geoffrey Fox, and Gregor Von Laszewski. "Gridtorrent framework: A high-performance data transfer and data sharing framework for scientific computing." (2007)., 8 pages plus a cover page.

* cited by examiner

COOPERATIVE DOWNLOAD AMONG LOW-END DEVICES UNDER RESOURCE CONSTRAINED ENVIRONMENT

FIELD OF THE INVENTION

In embodiments, the technical field of the invention is methods and systems for efficient arrangement, use, and management of networked electronic devices.

BACKGROUND

In emerging markets such as Africa, the proliferation of mobile technology and other social factors have attributed to rapid increase in content digitization and creation. Such contents include e-books, multimedia resources, music, games, etc. This proliferation is driven by mobile or e-Learning, library services, the booming entertainment services, and the like, but is also partly driven by campaigns for environmental friendly products and less use of printed materials e.g. newspaper.

Typically, for easy distribution, digitized content is stored in centralized servers where it can be easily accessed via mobile or sensory devices either through WiFi or Cellular network. As a result of this, various models and content sharing protocols have evolved. For example, Peer to Peer (P2P) file/content sharing models have evolved from early networks like Napster to later models like BitTorrent protocols. Also for example, client-server file/content sharing involves content that is stored in a server and presented to clients on request. Presently with these techniques, a user has to maintain the connection between the peers when downloading content.

However, these file sharing models present various major drawbacks in resource constrained environments such as in Africa, where various resources such as intermittent connectivity, bandwidth, time, battery power, etc. are limited in view of the popularity of low-end tablet/mobile/sensor devices.

In case where a large file (e.g. multimedia files such as video learning content) is to be downloaded and the user has limited bandwidth, the content acquisition is constrained by the above-mentioned factors.

Although cellular network connectivity has greatly improved, this is often not the case in remote or acute resource constrained areas such as in African classrooms, leading to poor learning and teaching experience. Improved methods for accessing network-stored content would be desirable to improve such resource constrained accessibility.

SUMMARY OF THE INVENTION

Goal of this invention include: to compute the Promise Index of node-based resource index and reliability index of individual low-end devices; to combine resources so as to reduce constraints, improve reliability score, and segment content to cooperatively download, aggregate and distribute chunks with intelligent error handling and response techniques; and to improve resource utilization for low-end devices which are common in emerging market while scheduling to download content.

In an aspect, then, is a method for cooperative downloading of data, the method comprising: determining the resources available for each node in an interconnected array of nodes; dividing a coherent set of data (e.g. content) on a remote device into a plurality of data chunks, wherein the number of data chunks in the plurality of data chunks is equal to or less than the number of nodes in the array of nodes; for each data chunk in the plurality of data cooperative chunks, assigning the data chunk to a node in the array of nodes, the assignment being based on the determined resources available for the assigned node, wherein each node is assigned either zero or one data chunk, such that the set of nodes assigned a data chunk forms a set of downloading nodes; downloading, by each node in the set of downloading nodes, the respective assigned data chunk to form a set of downloaded data chunks; selecting from the array of nodes at least one aggregator node, the selection based on the determined resources available for the selected node; retrieving, by the aggregator node or nodes, the downloaded data chunks from the set of downloading nodes; and recombining, by the aggregator node or nodes, the downloaded data chunks to form a copy of the coherent set of data. In embodiments:

the determined resources available comprises remaining battery life, available memory, available storage, and available download bandwidth, and past history of the node;

the method further comprises identifying the coherent set of data on a remote device, and retrieving metadata pertaining to the coherent set of data;

the method further comprises monitoring the resources available for each node in the array of nodes during the downloading of the respective assigned data chunk, and re-assigning a data chunk if a node becomes unsuitable for downloading;

the dividing the coherent set of data comprises downloading, from the remote device, metadata pertaining to the set of data;

wherein collecting resource data is based on monitoring, measuring or instrumenting physical devices/sensors such as the battery level, voltmeter sensor, current/remaining available memory, current/remaining storage space, bandwidth, type of network/connectivity (2 G, 3G, 4G, Wifi, etc), etc.;

wherein resources in a downloader node may be reconfigures or re-allocated based on content downloaded and distributed (e.g. instantiating virtual machine);

wherein determining or estimating resource index level may involve analyzing collected data about usages of physical resources per service/application (e.g. social media, camera);

wherein determining or estimating resource index level may involve analyzing collected data about usages of physical resources per service/application (e.g. social media, camera), and the instrumentation engine may decide to switch off some devices (e.g. GPS, accelerometer, camera, etc.) based on context analysis;

wherein the instrumentation engine may decide to switch off some devices (e.g. GPS, accelerometer, camera, etc.) based on context analysis;

wherein the determining the resources available for each node in an interconnected array of nodes comprises machine-readable instructions suitable to cause a master node to identify such resources;

wherein the determining the resources available for each node in an interconnected array of nodes comprises accessing one or more sensors for detecting any combination of the following resources: available memory, remaining battery life, available download bandwidth, and available CPU capacity;

wherein the determining the resources available for each node in an interconnected array of nodes comprises accessing (by a master node) one or more sensors for detecting any combination of the following resources: available memory, remaining battery life, available download bandwidth, and available CPU capacity, wherein the one or more sensors are resident in a node from the array of nodes;

the method further comprises selecting from the array of nodes a master node and configuring the master node to coordinate the downloading and aggregator nodes;

a plurality of nodes are selected as aggregator nodes, and wherein each aggregator node retrieves downloaded data chunks from the set of downloading nodes;

prior to determining the resources available for each node in the array of nodes, one node from the array of nodes identifies the coherent set of data on the remote device;

the downloading nodes are selected based on available download bandwidth and remaining battery life, and the aggregator node or nodes are selected based on remaining battery life and available memory;

the method further comprises analysing the determined resources for a node in the array of nodes to generate a reliability index indicative of the reliability of the node as a downloader node, aggregator node, or master node;

the method further comprises distributing, from the aggregator node or nodes, the copy of the coherent set of data to each node in the array of nodes; and the method further comprises displaying, on an interface, the copy of the coherent set of data;

the method further comprises outputting the copy of the coherent set of data;

the method further comprises outputting the copy of the coherent set of data via a display;

the method further comprises outputting the copy of the coherent set of data via a user interface;

the method further comprises altering a user interface on a node in the array of nodes so as to display the copy of the coherent set of data;

the method further comprises altering a user interface on each node in the array of nodes so as to display the copy of the coherent set of data;

the method further comprises altering a user interface on a node in the array of nodes so as to display the copy of the coherent set of data and to provide content specific tools to the user of the node;

the method further comprises altering a user interface on a node in the array of nodes so as to display the copy of the coherent set of data and to provide editing and/or notating and/or display and/or commenting tools to the user of the node;

the method further comprises distributing, by the aggregator node or nodes, the copy of the coherent set of data to all non-aggregator nodes in the array of nodes, such that all nodes in the array of nodes obtain a copy of the coherent set of data;

the method further comprises distributing, by the aggregator node or nodes, the copy of the coherent set of data to all non-aggregator nodes in the array of nodes, and storing the distributed copy of the coherent set of data locally by each node, such that all nodes in the array of nodes obtain and store a copy of the coherent set of data.

In an aspect is a system comprising a plurality of nodes, each node of the plurality of nodes comprising: a processor; a memory coupled to the processor, the memory configured to store program instructions for instructing the processor to carry out the method as above. In embodiments:

the plurality of nodes are interconnected via a network; and the program instruction are configured to instruct one node from the plurality of nodes to act as a master node, wherein selection of the master node is based on the determined resources, and wherein the master node coordinates the downloader and aggregator nodes.

In an aspect is a method for cooperative downloading of data, the method comprising: identifying, by an initiating node, an array of nodes in communication via a network, the array of nodes comprising the initiating node; characterizing the resources available for each node in the array of nodes; identifying a single master node from the array of nodes; identifying a set of downloading nodes from the array of nodes; identifying an aggregator node or nodes from the array of nodes; for each downloading node in the array of nodes, assigning either zero or one data chunk from a coherent set of data chunks residing on a remote device; downloading, by the set of downloading nodes, the assigned data chunks from the remote device; and aggregating, by the aggregator node, the downloaded data chunks to form a copy of the coherent set of data. In embodiments:

the downloading nodes and the aggregator node or nodes are identified by the master node; and the method further comprises a recruitment algorithm that continuously monitors the resources available to the downloading nodes and aggregator node or nodes, dynamically allocates data chunks to downloading nodes based on the determined resources available, and dynamically assigns aggregator tasks based on the determined resources available.

In an aspect is a method for cooperative downloading of data, the method comprising: identifying, by an initiating node, an array of nodes in communication via a network, the array of nodes comprising the initiating node; for each node in the array of nodes, characterizing the promise index for the node, wherein the promise index is a function of a resource index based on the instantaneous resources available to the node and a reliability index based on the historical log of the node; identifying, based on the resource, reliability, and promise indices, a set of downloading nodes from the array of nodes; identifying, based on the resource, reliability, and promise indices, an aggregator node or nodes from the array of nodes; for each downloading node in the array of nodes, assigning either zero or one data chunk from a coherent set of data chunks residing on a remote device; downloading, by the set of downloading nodes, the assigned data chunks from the remote device; aggregating, by the aggregator node, the downloaded data chunks to form a copy of the coherent set of data; and displaying the copy of the coherent set of data on a display associated with the initiating node. In embodiments, the method further comprises dynamically monitoring the resource, reliability, and promise indices for each node in the array of nodes, and dynamically assigning download and aggregator tasks based on the monitored indices.

In an aspect is a system comprising: a processor; a memory coupled to the processor, the memory configured to store program instructions for instructing the processor to carry out any of the methods described above and herein.

These and other aspects of the invention will be apparent to one of skill in the art from the description provided herein, including the examples and claims.

DETAILED DESCRIPTION OF VARIOUS EMBODIMENTS

Figure 1:
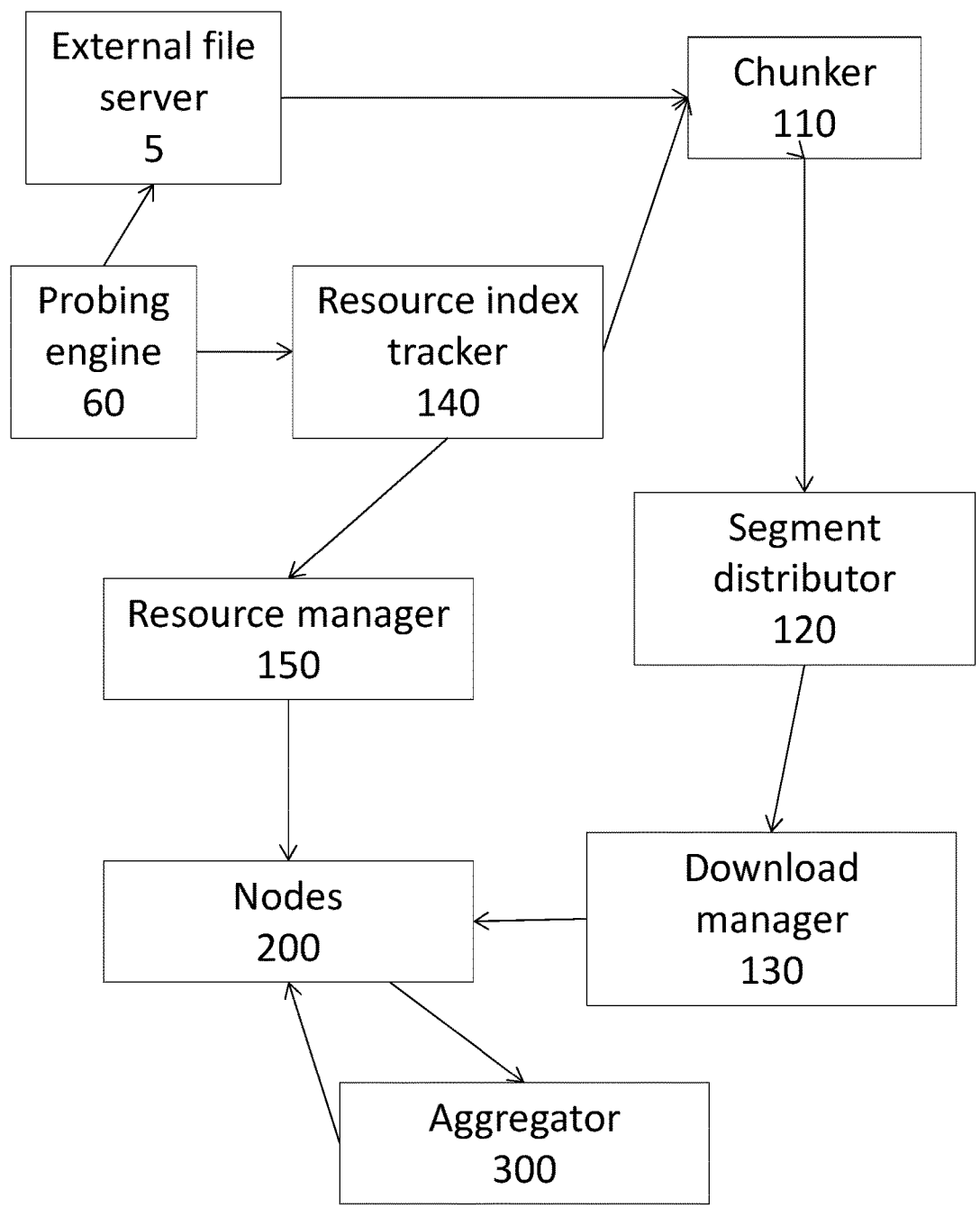
FIG. 1 provides a flowchart showing the overall process of allocating a plurality of data chunks to nodes according to an embodiment of the invention.

In an aspect is a method for intelligent content downloading under resource constrained situation using predicted resource constrained level and reliability index of low-end devices.

In an aspect is a system for collaboratively and efficiently downloading contents in a resource constrained environment by (1) segmenting and sequencing the content to be downloaded, (2) determining state of available resources of member nodes, and (3) reassigning failed task of timed out nodes.

In an aspect is a cooperative content downloading system comprising: probing file/content server initiating content downloading process by a group of qualified nodes within an ad-hock network setting; a resource monitoring module that tracks the current and on-going nodes activities to determine the resource level of a node; a reliability analysis module that measures how a device in the network is reliable to receive a downloading, aggregating or distributing task; a predictive module that determines how a node is promising to take up a task based on measured resource and reliability levels and other context information; and an error handling module that constantly checks if a node is still in system assigned role. In embodiments the recruitment algorithm (recruitment companion) dynamically decides the size of a chunk segment based on node's dynamic values R, RI, PI, etc. In embodiments, the method of reconstruction of downloaded content and delivery in the ad-hoc network further allow all nodes to be able to independently reconstruct the file by requesting all segments from other nodes.

In an aspect is a method for cooperative downloading of data, the method comprising: determining the resources available for each node in an interconnected array of nodes; dividing a coherent set of data (e.g. content) on a remote device into a plurality of data chunks, wherein the number of data chunks in the plurality of data chunks is equal to or less than the number of nodes in the array of nodes; for each data chunk in the plurality of data chunks, assigning the data chunk to a node in the array of nodes, the assignment being based on the determined resources available for the assigned node, wherein each node is assigned either zero or one data chunk, such that the set of nodes assigned a data chunk forms a set of downloading nodes; downloading, by each node in the set of downloading nodes, the respective assigned data chunk to form a set of downloaded data chunks; selecting from the array of nodes at least one aggregator node, the selection based on the determined resources available for the selected node; retrieving, by the aggregator node or nodes, the downloaded data chunks from the set of downloading nodes; and recombining, by the aggregator node or nodes, the downloaded data chunks to form a copy of the coherent set of data.

In an aspect is a method for cooperative downloading of data, the method comprising: identifying, by an initiating node, an array of nodes in communication via a network, the array of nodes comprising the initiating node; for each node in the array of nodes, characterizing the promise index for the node, wherein the promise index is a function of a resource index based on the instantaneous resources available to the node and a reliability index based on the historical log of the node; identifying, based on the resource, reliability, and promise indices, a set of downloading nodes from the array of nodes; identifying, based on the resource, reliability, and promise indices, an aggregator node or nodes from the array of nodes; for each downloading node in the array of nodes, assigning either zero or one data chunk from a coherent set of data chunks residing on a remote device; downloading, by the set of downloading nodes, the assigned data chunks from the remote device; aggregating, by the aggregator node, the downloaded data chunks to form a copy of the coherent set of data; and displaying the copy of the coherent set of data on a display associated with the initiating node. In embodiments, the method further comprises dynamically monitoring the resource, reliability, and promise indices for each node in the array of nodes, and dynamically assigning download and aggregator tasks based on the monitored indices.

In an aspect is a method for cooperative downloading of data, the method comprising: identifying, by an initiating node, an array of nodes in communication via a network, the array of nodes comprising the initiating node; characterizing the resources available for each node in the array of nodes; identifying a single master node from the array of nodes; identifying a set of downloading nodes from the array of nodes; identifying an aggregator node or nodes from the array of nodes; for each downloading node in the array of nodes, assigning either zero or one data chunk from a coherent set of data chunks residing on a remote device; downloading, by the set of downloading nodes, the assigned data chunks from the remote device; and aggregating, by the aggregator node, the downloaded data chunks to form a copy of the coherent set of data.

In an aspect is a system comprising a plurality of nodes, each node of the plurality of nodes comprising: a processor; a memory coupled to the processor, the memory configured to store program instructions for instructing the processor to carry out the method as above.

The methods described herein involve reconstruction of downloaded content and delivery in ad-hoc network, and they have a number of advantages and uses. For example, the methods allow users to minimize use of costly resources on each node. Low-cost devices, wherein the likelihood of a node to be under resource constraint is high, are ideally suited for the methods, although the methods can be generalized to high-end devices as well. The methods can assist resource constrained situations, particularly because the methods minimize the use of costly resources on each node, including bandwidth use and battery usage. A wide-range of application areas are suitable, include those in emerging markets or generally in low resourced environment such as in the classroom, in community training, field data collection, mobility data collection (e.g., roads and road infrastructure data collection on moving vehicles, etc.) and the like.

In an aspect is a system comprising: a processor; a memory coupled to the processor, the memory configured to store program instructions for instructing the processor to carry out any of the methods described above and herein.

The methods involve an interconnected array of nodes. The array may comprise any number of nodes such as in the range of 3-1000, 3-500, 3-100, 3-50, or 3-25 nodes, or such as equal to or greater than 3, 5, 7, 10, 15, 20, 25, 50, 100, 150, 200, 300, 500, or 1000 nodes. The nodes are interconnected (i.e., networked) by any suitable physical or wireless networking infrastructure/architecture, including WAN, Ethernet, WiFi, Bluetooth, WiMAX, 3G, 4G, GSM, and the like.

In embodiments, the nodes form a wireless ad-hoc network (WANET). The nodes on the ad-hoc network may be dynamically added or dropped depending on connectivity and other aspects. The ad-hoc network is also connected to one or more content servers, such as a content server on the Internet. The content server is not one of the nodes in the interconnected array of nodes but is capable of communicating with each of the nodes in the array. Such communication may however be intermittent, slow, or otherwise unreliable. In embodiments, the content server is HTTP1 compliant (or the equivalent), such that individual chunks of data from a coherent set of data can be accessed individually on the server.

In embodiments, one of the nodes in the array of nodes, referred to herein as the initiating node, identifies a coherent set of data (i.e., a data file) on a content server that the initiating node seeks to download. The coherent set of data is content and may be a video file, text file, audio-visual file, image file, data file, or any combination thereof. The coherent set of data may contain pointers to secondary coherent sets of data, and if those secondary coherent sets of data are also desired for download by the initiating node, they become part of the coherent set of data for the purpose of the methods disclosed herein. Identification of the coherent set of data by the initiating node may be based on user input or based on an automatic process that results in such identification (e.g., auto-updates and the like).

In embodiments, the initiating node also analyses the nodes in the ad-hoc network (i.e., the array of nodes), characterizing each node's available resources and reliability. Resources may be selected from remaining battery life, available memory (i.e., volatile memory), available storage (i.e., non-volatile storage), unused processor capacity, available download bandwidth, past history of the node, and/or node/network cohorts. As described herein, sensors are incorporated into the nodes and/or routers and/or other devices on the network such that such information can be obtained. Reliability includes the stability of the network connection for the node, stability of the power supply, and other reliability factors. It will be appreciated that certain physical sensors may be present in each node (or, in embodiments, in specific designated) nodes in order to make such measurements. For example, a voltmeter sensor may be present to measure remaining battery life. Also for example, a frequency counter or other suitable sensor may be present to measure available download bandwidth. Other characterization input may be determined from analysing node memory (e.g., past history of the node) and/or analysing router data for a router on the network and in communication with the characterized node(s).

The characterization results in determination of three factors: a resource index (R); a reliability index (RI); and a promise index (PI). The resource index is an estimated resource level required to decide a node's ability to collaboratively download a content based on the current usage of on-going and planned activities on the node. The reliability index is the computed value that informs how a node is reliable to be recruited for downloading a chunk and/or aggregating chunks based on historic log, past reliability pattern, current resource state, etc. The promise index predicts how a node is promising to take up a particular role (be it master, downloader, or aggregator, as described herein) dynamically using functions of the reliability index and current resource index of a node.

The characterization by the initiating node is, in embodiments, solely for the purpose of selecting a master node from the array of nodes. In some embodiments the initiating node becomes the master node, either by default (i.e., the nodes are configured to automatically nominate the initiating node as the master node, in which case characterization of the nodes by the initiating node is unnecessary and is not carried out) or because the initiating node most closely matches the criteria set for master node as determined by the characterization. Characteristics for a master node (i.e., desired values for R, RI, and PI) can be preselected and can be modified as needed according to the context. For example, the master node may be selected as a node with sufficient or more than sufficient remaining battery life (i.e., sufficient to keep the node operating throughout the expected/calculated length of time required to finish the download and aggregation and distribution), sufficient or more than sufficient unused CPU capacity (i.e., sufficient to ensure that the node can monitor and coordinate all activities of the nodes), and sufficient or more than sufficient network connectivity (e.g., a reliability index indicating a stable network connection sufficient to allow the node to maintain monitoring of the activities of all other nodes).

In embodiments, multiple nodes connected to the ad-hoc network each individually probe the content server. The first node that passes the selection criteria as determined using a node selector function automatically becomes the master node. Further details of the node selector function are provided herein.

The master node, once selected, characterizes the resources and reliability of all other nodes in the array. Such characterization is similar to the characterization by the initiating node, and results in values for R, RI, and PI for each node in the array of node. The purpose for the characterization by the master node is for the master node to assign roles (downloading and aggregator nodes as described herein) to the various nodes in the array of nodes. Assignment of roles can be based on preselected criteria (i.e., absolute values) for the downloading and aggregator roles, or can be based on relative index values compared across the various nodes in the array of nodes. For example, the resource indices can be ranked from greatest to least and the roles assigned based on the relative ranking. Roles are assigned in order to take advantage of resources where they are located. In embodiments, the R, RI, and PI values are used exclusively for assignment of roles by the master node. In other embodiments, the master node can use the R, RI, and PI values as well as more fine grained data (e.g., actual remaining battery life, actual CPU usage values, etc. for each node) in order to assign roles.

For example, downloader nodes may be those with high remaining battery life, high download bandwidth, and low CPU usage. For example, downloader nodes may be those with: remaining battery life that is sufficient or more than sufficient to keep the node operating throughout the expected/calculated download time for an assigned data chunk; a download bandwidth that will enable the node to complete download of the expected data chunk in a reasonable amount of time, such as approximately the same amount of time that other nodes will require for their respective downloads; and CPU usage that leaves sufficient CPU capacity for processing the download of the expected data chunk. Available storage may be less important for downloading nodes.

Also for example, aggregator nodes may be those with high remaining battery life and high available storage. For example, aggregator nodes may be those with: remaining battery life that is sufficient or more than sufficient to keep the node operating throughout the expected/calculated aggregation time for the coherent set of data; the available storage is sufficient or more than sufficient to store aggregated chunks (i.e., chunks from multiple downloader nodes). Download bandwidth may be less important for aggregator nodes.

Selection and assignment of a master node and subsequent selection and assignment of downloader nodes, aggregator nodes, and idle nodes may be accompanied by physical changes to the nodes as they receive their various assignments, and/or may further result in re-allocation of resources and priorities on the network. For example, the network may be reconfigured (in particular, routers on the network may be reconfigured) to ensure that downloading nodes are given priority in allocation of download bandwidth, particularly immediately after selection of the set of downloading nodes or selection of any single downloading node. For example, the network may be reconfigured (e.g., routers on the network may be reconfigured) to prioritize data traffic originating from downloader nodes destined for aggregator nodes. In embodiments, one or more nodes may be individually reconfigured. For example, a node may be selected as a downloader node and subsequently reconfigured to devote more of the node's resource (battery power, network bandwidth, etc.) to the assigned task of downloading a section of the coherent set of data. For example, a node may be selected as an aggregator node and subsequently reconfigure to devote more of the node's resources (battery power, memory, CPU activity, etc.) to the assigned task of retrieving downloaded content from the downloader nodes and aggregating the content as appropriate. For example, a node may be selected as an idle node and subsequently reconfigured to put more resources in idle mode, so as to save resources in the event that the node is later reassigned by the master node. In embodiments, new or current virtual machines may be incorporated into the network by the master node in order to efficiently complete the downloading and aggregating task. In embodiments, the network may be reconfigured to include such virtual machines. In embodiments the network may be reconfigured to access additional nodes, or additional memory, where such resources are available on the network.

The number of downloader nodes, aggregator nodes, and idle nodes may be selected according to predetermined values or may be selected based on the context (e.g., the characteristics of the coherent set of data, the quality of the network connections, etc.). In embodiments, the downloader nodes comprise between 40-90% or 40-80% or 50-80% of the total nodes in the array of nodes, with the aggregator nodes comprising between 5-30 or 10-30% of the total nodes, and the idle nodes comprising the remaining balance of nodes (e.g., 3-30% of the total nodes), keeping in mind that one node in the array of nodes is a master node. For example, in an array containing 20 nodes, one of which is the master node, the downloader nodes may be 14 in number, the aggregator nodes may be 2 in number, and the idle nodes may be 3 in number. Any other suitable distribution of the nodes is also envisioned.

The master node further comprises a number of modules, including a resource manager module, a download manager module, a probing engine, and a resource index tracking algorithm.

The probing engine initiates the content downloading process by communicating with other modules and with other nodes. In embodiments, the probing engine communicates directly with the content server. In embodiments, all nodes comprise a probing engine, particularly since any node in the array of nodes can be the initiating node, and the probing engine is used by the initiating node to identify a desired coherent set of data desired for download. A specialized node (e.g., an initiator node or the master node) may run the Probing Engine to find the file metadata from the server e.g. file size and modified time.

In embodiments, the master node or the initiator node pings the content server to get metadata about the coherent set of data (i.e., the file to be downloaded). Such metadata may include the file size, whether the file links to other files, the file format, and the like. In embodiments, the master node broadcasts this information to all other nodes in the network such that the other nodes will have a copy of the information pertaining to the content to download. The master node or initiator node can simply publish the information on global history bus to which the other nodes subscribe. In embodiments this information is used by the various nodes according to their assigned roles (e.g., an aggregator node may use the information to reconstruct the original coherent set of data, etc.).

The resource manager module keeps track of the remaining resource index (i.e., the index that is determined by available storage, battery life, network connectivity patterns, etc) at each node. In embodiment the resource manager module estimates when a resource may likely be available again (e.g. a particular node was network connected 3 times in last 2 hours and the battery level was 10% in past 5 minutes, etc) and communicate this information with the Resource Index Tracker (described herein). This tracking is done throughout the downloading process to ensure that maximum efficiency is maintained. The master node may reassign roles based on changes in the resource indices, as determined by the resource manager module. Indeed, the system monitors the on-going and planned activities of each node to determine the resource constrained level and reassign roles, including the role of the master node if necessary. A node can change a role (i.e. Master, Downloader, Aggregator) based on computed values such as R, RI, and PI, as well as other factors determined by the master node.

In embodiments, some nodes (e.g. less than or equal to 1, 2, 3, 5, or 10 nodes, or less than or equal to 20, 15, 10, or 5% of the nodes in the array) in the array of nodes are assigned by the master node to be initially idle. For example, idle nodes are held in reserve in case a downloading node or an aggregator node drops from the network (e.g., due to a dead battery or a dropped network connection). The master node continues to monitor the resource, reliability, and promise indices of the idle nodes, and substitutes an idle node when/where appropriate and/or necessary.

In embodiments, a chunker module in the master node chunks the content (i.e., divides the coherent set of data) into a given number of logical segments (also referred to as "chunks"). The size of each segment can be determined in a variety of ways. In embodiments, each chunk is assigned to a downloader node, and the size of a segment is determined based on the resources available at the node that is assigned to download the segment. Alternatively, the size of the segments can be non-specific and averaged based on the average of resource indices in the array of nodes. In embodiments the sizes of segments are dynamic—as nodes increase or decrease their resource indices, segment sizes can be reassigned to ensure that resources are being used most efficiently. In embodiments a recruitment companion module in the master node, which module continuously monitors R, RI, and PI values of the downloader nodes and dynamically updates segment sizes accordingly. The recruitment companion also dynamically assigns aggregator tasks based on determined resources. Similarly, to downloading capacity, the distribution and reconstruction capacity of the various nodes can be monitored and can be used to assign segment sizes.

In addition to determining segment sizes, the chunker module in the master node determines the locations within the content to break the content into chunks. Logical locations include for example, minute markers within a video file. The total number of logical segments can be predetermined and is, in embodiments, based on the number of downloader nodes. For example, if N nodes are assigned as downloader nodes, the chunker module may create N chunks if each chunk is suitable for downloading by one downloader node. Alternatively, if the chunks are selected so as to be smaller in size, it may be appropriate for each downloader node to download two chunks, in which case the chunker module would create 2N chunks.

After determining the logical segments (i.e., chunk sizes and file locations for defining chunks), the master node assigns the segments to the downloading nodes, and the downloading nodes begin the downloading process. The downloading nodes access their assigned segments from the content server and store the downloaded material locally. During the downloading process, the resource manager monitors the status of each downloading node—for example the node's R, RI, and PI values, as well as its progress in the download. If the node drops out of the ad-hoc network, or the node's R, RI, or PI values drop to unacceptable levels, the master node may reassign the node and transfer the node's assigned segment to another available node (such as an idle node or a node that has already finished downloading its assigned segment). This process is known as error handling and applies to downloader nodes as well as aggregator nodes. The nodes can also be configured such that, if the master node registers an error (drops from the network, for example), another node can be promoted to master node so that the process can continue.

The downloaded chunks must be aggregated in order to reconstruct a copy of the original coherent set of data. Accordingly, certain nodes from the array of nodes are selected as aggregator nodes. Aggregator nodes, under the direction of the master node, accept multiple downloaded data chunks from multiple downloader nodes and combine the data chunks as appropriate to reconstruct the coherent set of data. Depending on the number of downloader nodes and other factors (e.g., connectivity, available resources, etc.), either one node or more than one nodes may be assigned as aggregator nodes. In embodiments, a plurality of nodes is selected as aggregator nodes. The number of aggregator nodes may be, for example, N/2 or less than N/2, wherein N is the number of downloader nodes. In some embodiments, a single node, or two nodes, is/are sufficient as the aggregator node(s). In embodiments, the number of aggregators is $\log_2 N$, where N is the number of downloader nodes.

Aggregation by the aggregator node(s) may follow a variety of processes, provided that the end goal is to form a copy of the original coherent set of data and distribute that copy to the nodes in the array of nodes. In one embodiment, a tree-structure is used. The downloader nodes are divided into groups of two, three, four, or more than four downloader nodes. Each node in a given group sends its downloaded data chunk(s) to a single first-level aggregator node that is common to all nodes in the given group. The aggregator node therefore receives all data chunks downloaded by the downloading nodes in its assigned group, and recombines the data chunks as appropriate to form a partial copy of the coherent set of data. In this embodiment, first-level aggregator nodes are further divided into groups of two, three, four, or more than four aggregator nodes. Each first-level aggregator node sends its reconstructed partial copy of the coherent set of data to a second-level aggregator node. The second-level aggregator node receives all data from the first-level aggregator nodes in its group, and recombines the received data as appropriate to form a more complete (but possibly still partial) copy of the coherent set of data. The second-level aggregator nodes are again grouped, and the process continues until a small number of aggregator nodes (possibly, 1, 2, or 3 aggregator nodes), referred to as top-level aggregator nodes, receive data from other aggregator nodes and are able to form a compete copy of the coherent set of data. At this point distribution (described below) is carried out. In an alternative embodiment, only one set of aggregator nodes are present (or only a single aggregator node is present). Each aggregator node receives data chunks from all downloader nodes, and each aggregator node is therefore able to immediately form a complete copy of the coherent set of data. This embodiment is suitable when the number of downloader nodes is small enough such that communication between all downloader nodes and a single aggregator node is manageable.

Transmission of data chunks from a downloader node to the aggregator node (as well as between aggregator levels) can be done in packets as the downloader node receives the data, or as a single bulk transmission of the entire data chunk once the data chunk has been entirely downloaded.

The aggregator node recombines data chunks according to instructions received from the master node. In embodiments, as part of the metadata that a master node receives from a content server about a coherent set of data, the master node receives a file size (with which the aggregator node can determine if it has received a full set of data chunks sufficient to reconstruct the entire coherent set of data). The master node also receives or determines a scheme that enables the aggregator nodes to properly reconstruct the coherent set of data from the data chunks into which it is divided. Such scheme creates a sequencing of the data chunks. The said scheme may describe a workflow about how the aggregation process should be done based on cohort analysis of prior efficient aggregation or downloading on similar content or chunks per aggregator nodes. Alternatively, each aggregation node can fetch the cohort analysis values of historic similar aggregation patterns for a chunk from the global history table (GHT), as discussed herein.

Once the aggregator node(s) has a complete copy of the coherent set of data, the method further comprises distributing, from the aggregator node or nodes and via the ad-hoc network, the copy of the coherent set of data to each node in the array of nodes. In embodiments, all nodes in the array of nodes received the complete copy. In embodiments, nodes that were part of the original array of nodes but dropped from the network during the downloading or aggregating process may be later reconnected to the network and receive from an aggregator node the complete copy. It should be clear that, using the disclosed methods, each downloader node is connected to the content server (i.e., connected externally beyond the ad-hoc network) for only the period of time that is required to download a data chunk, as opposed to previous methods where each node is required to be connected to the content server for the entire length of time required to download the entire coherent set of data. The ad-hoc network may remain interconnected even where the external network connection to the content server is disrupted, thereby allowing the array of nodes to continue communicating and to complete the process of distributing a complete copy of the coherent set of data to all nodes.

In embodiments, the method further comprises outputting the copy of the coherent set of data via an output device. For example, the method comprises displaying, on an interface, the copy of the coherent set of data. The interface can be a visual or audio-visual interface, or any other appropriate interface given the type of data in the coherent set of data. Such display or other form of output can be done at each node in the array of nodes having received the complete copy of the coherent set of data, such as at all nodes in the array of nodes. In embodiments, display is automatic—once the node receives the complete copy of the coherent set of data, the node is configured for automatic display of the same. Examples of suitable output devices include displays (e.g., screens or projectors), and such displays typically involve a user interface. Accordingly, the output involves modifying a user interface to display the copy of the coherent set of data, and may further involve modifying the user interface based on the type of data that is thus displayed (e.g., providing navigation tools, editing tools, etc.). Another example of an output device is a printer or other device suitable for creating a physical copy of the copy of the coherent set of data.

In embodiments, the method further comprises outputting the copy of the coherent set of data as a data file to an output device or storage medium (without necessarily physically displaying or printing the data file). For example, the method comprises storing the copy of the coherent set of data in a non-volatile memory such as a hard disc drive, DVD, DVR, flash memory device, or the like. The method may involve outputting the copy of the coherent set of data to a data port (e.g., a USB port) or a data interface to a data network.

The methods may further involve, in embodiments, inputting a file to the server such that the file can be accessed on the server by the ad-hoc network. The input may involve any suitable input device or method, including image capture of a physical document via an optical scanner or camera, or data transfer from another device such as a portable storage device or external server. Accordingly, the input device may comprise a data port on a data network, an interface such as a USB port or the like, or a physical device such as a DVD or DVR device. Such devices will typically be located at the server although in some embodiments one of the nodes in the ad-hoc network may be fitted with such an input device in order to upload files.

An embodiment for executing the roles and processes described herein is now described. In the embodiment, a global history table (GHT) is a hash table used to store computed values, and other metadata information, such as metadata about the coherent set of data and metadata about the nodes and their activities.

The master node (and any other node type) is selected using the node selector function. A locally available variant of block chain algorithm implementation fetches and distributes past reliability of the node available in the GHT. Each node's reliability information is determined as a value described as the Mean Time to Next Unavailability (MTTU) based on the historic log, past reliability pattern, and current resource index. The MTTU is further updated based on the output of the resource index tracking algorithm. The resource index tracking algorithm uses trends in the available resources to predict from previous behaviour how/whether a node's current status or indices is/are going to change. The PI of a node is then computed using a function of the reliability and current resources for a node. When nodes have equal resource index, a node with maximum MTTU can be used to select the most promising node. If there is a tie then an arbitrary node is selected from the tied nodes.

Maximize MTTU, Maximize CR, and Minimize CL→$PI_i$ for node i

If the Current Resources (CR) and Current Load (CL) are the same then $PI_{opt}$ is selected as:

$PI_{opt}$=Max($MTTU_1$, $MTTU_2$, ... $MTTU_n$)

wherein N is the total number of available nodes in the network excluding the master.

By monitoring the current usage of ongoing and planned activities on the node, the resource index tracker estimates the amount of resources available and also decides the portion that would enable to collaboratively download e.g. size X of the file, wherein the file is of size Z (where X≤Z).

For example, the system receives two videos, content $C_1$ and $C_2$, as target downloads (i.e., coherent sets of data) on the server. The videos are of duration $T_1$ and $T_2$, and of size $S_1$ and $S_2$, on an average δ amount of resource index needed to perform planned activities. Based on estimated resources, it is likely that δ' amount (where δ'<δ) of resource index would be allocated to download up to size $S'_1$ for $C_1$ and $S'_2$ for $C_2$ in times $T'_1$ and $T'_2$.

Sensory reading, activities of each application, and context information are used to determine the source (server) capability, select a master node, etc. Nodes disclose to the master node their computer resource index and reliability index by updating the GHT, [<$S'_1$, $T'_1$>, <$S'_2$, $T'_2$>] as their downloading capability. The master node stores all the nodes' resource indexes {[<$S'_1$, $T'_1$>, <$S'_2$, $T'_2$>], ... [<$S'_N$, $T'_N$>, <$S'_N$, $T'_N$>]} on publicly accessible resource index hash table H within GHT. Each node in the network runs a copy of the resource predictor algorithm.

The resource manager keeps track of remaining resource index (e.g., storage, battery life, network connectivity patterns, etc) at each node to estimate when a resource may likely be available again (e.g., connected 3 times in last 2 hours/battery level was 10% in past 5 minutes etc) and communicate with Resource Index Tracker.

The chunker takes values from the resource index hash table H and content (with metadata information) to be downloaded and performs the following three functions:

(1) Determination of MaxChunk (H)—the chunker decides on the maximum number of segments M (where M<N) wherein each with a minimum segment size $S_{min}$ and runs a recruitment function to find K number of nodes that satisfy this requirement based on the values in H and metadata information.

(2) Recruit (N)—the chunker runs a campaign algorithm to recruit the best K nodes out of N nodes, according to the following algorithm: start by arranging the N nodes into two groups depending on the role being played, active (ANT) and aggregator nodes, based on PI values; the top V (where V≤K) nodes will be added into ANT's group and the remaining N-V nodes become aggregator nodes; and if $N*S_{min}$>S, then the optimal number of segments is M such that M<N.

(3) Divide (C)—the chunker divides content C of size S into M dynamic logically segments ($s_1$, $s_1$, ... $s_M$) of corresponding download values Δ (Δ$_1$, Δ$_2$, . . . Δ$_M$). A segment is defined by the temporal/spatial information of its boundaries (e.g. segment from 2nd to 3rd minute of video, or paragraphs 12 to 30 on pages 3 and 4 etc.)

Given Δ values to be downloaded by M nodes collaboratively, use a segment distributor module to allocate segments and distribute Δ across each selected node by matching Δ$_i$ with individual resource index such that download assignment is proportional to the current resource index of a node.

The download manager then utilizes a tree structure to organize and track the segments that are to be downloaded. This tree structure can be reorganized so as to accommodate the resources available in the array of nodes dynamically using approximately log$_2$(K) rounds of a tournament for the download, where N is the number of chosen participants in the download process.

Error handling is the responsibility of the master node. During errors where an active node drops off, the remaining nodes can be recruited to continue the download. The resume download is queued by the error-handling algorithm. When there is an available node, during failure the Recruit (N) function is run again to select a suitable candidate for graduation into an ANT. If no other free node exists, then the first node to complete becomes the assigned node. If the chunks assigned were such that S$_{size}$>S$_{min}$ and the arrival of nodes is such that AT$_a$, −AT$_b$≥T$_e$ (where T$_e$ is the minimal integer that can be used as clock drift for concurrent events) then the chunker is invoked to split the data into S$_{min}$ sized blocks for the set of remaining nodes <T$_a$ . . . T$_b$>. The master node further checks the tracker information to see how much of the segment had been aggregated in the available nodes. The newly selected node for resume is allocated the remaining range of the file segment. A distributed hash table is used to recover error states where the master node crashes. The newly elected master can recreate the tracker information for the file using the information available in GTH.

The aggregation process commences after the segments are downloaded and made available to the aggregator nodes. A variant of BitTorrent is used with Distributed Hash Table and the Master node acting as the Bit Torrent tracker to aggregate files locally. Files are aggregated using the Bit Torrent protocol (or any suitable Peer-to-Peer protocol) with the master acting as a bit torrent tracker. The tracker although present is only used to make peer discovery faster, as a measure of redundancy and in cases where the master node fails. The aggregator nodes may continue to find peers using Local peer discovery while a new master is being created.

The above disclosure and embodiment, and the figures provided herein, are provided merely as examples and to show architectures and interconnectivity of components and modules of the various systems described herein. Like numbers across the various figures are intended to indicate like components. In the figures, arrows are meant to show connectivity/communication but the use of single-directional arrows is not meant to imply that connectivity/communication is only single-directional.

With reference to FIG. 1, there is a flowchart showing the overall process of allocating a plurality of data chunks to nodes is shown according to an embodiment of the invention. External file server 5 is accessed by probing engine 60, which probing engine may be part of the initiating node or the master node. Chunker 110 (part of the master node, not shown) creates a set of data segments (data chunks) from a coherent set of data (not shown) on file server 5. Segment distributor 120 communicates with download manager 130 (both part of the master node) in order to coordinate downloading by nodes 200 of the identified data segments. Nodes 200 are constantly monitored by resource manager 150 and download manager 130, and the data segments (chunks) that they download are communicated to aggregator 300. Aggregator 300 is also monitored by resource manager 150 (connection not shown) and reconstructs a copy of the coherent set of data. The copy of the set of data is transmitted back to nodes 200 once completed, as well as to the master node. Resource index tracker 140 continuously or periodically characterizes R, RI, and PI for the nodes 200 and aggregator 300 (connections not shown).

Figure 2:
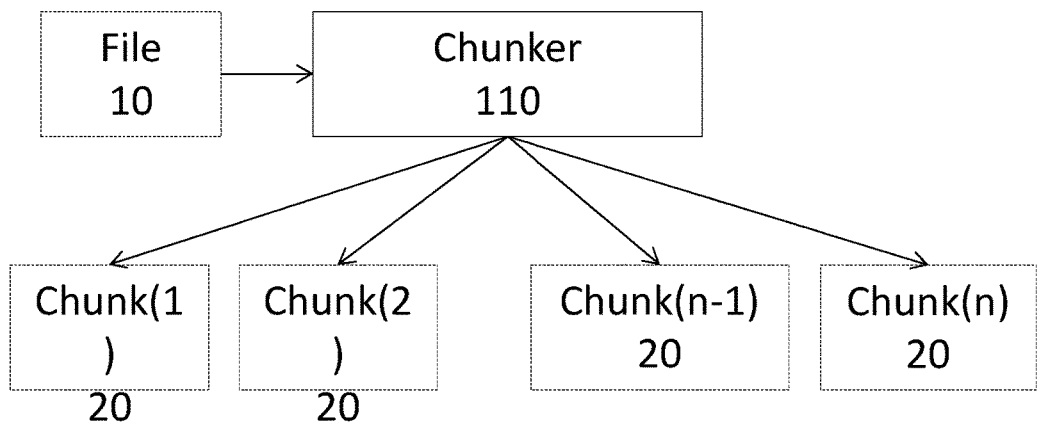
FIG. 2 provides a flowchart showing the conversion of a coherent set of data (i.e., a data file) to a plurality of data chunks according to an embodiment of the invention.

With reference to FIG. 2, there is provided a flowchart showing the conversion of a coherent set of data 10 (i.e., a data file) to a plurality of "n" data chunks 20 via chunker 110.

Figure 3:
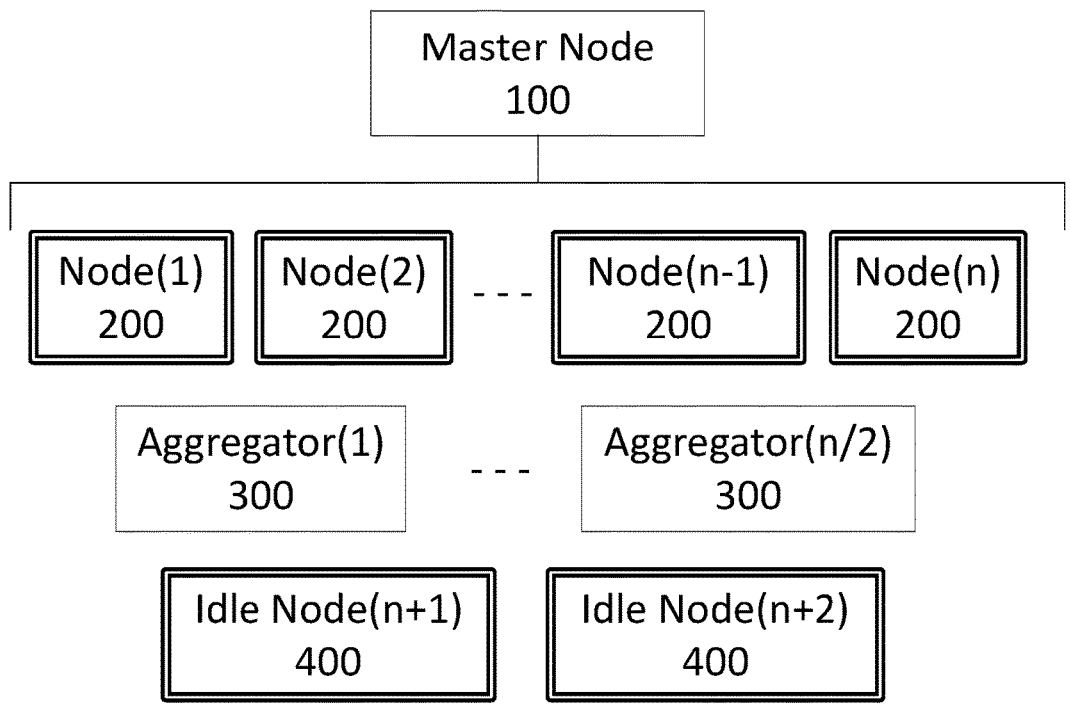
FIG. 3 provides a flowchart showing the allocation of roles among nodes by the master node according to an embodiment of the invention.

With reference to FIG. 3, there is provided a flowchart showing the allocation of roles among nodes by the master node 100. In the embodiment shown, the various nodes in the array of nodes are divided into "n" downloading nodes 200 (labelled simply as "nodes"), "n/2" aggregator nodes 300, and two Idle Nodes 400.

Figure 4:
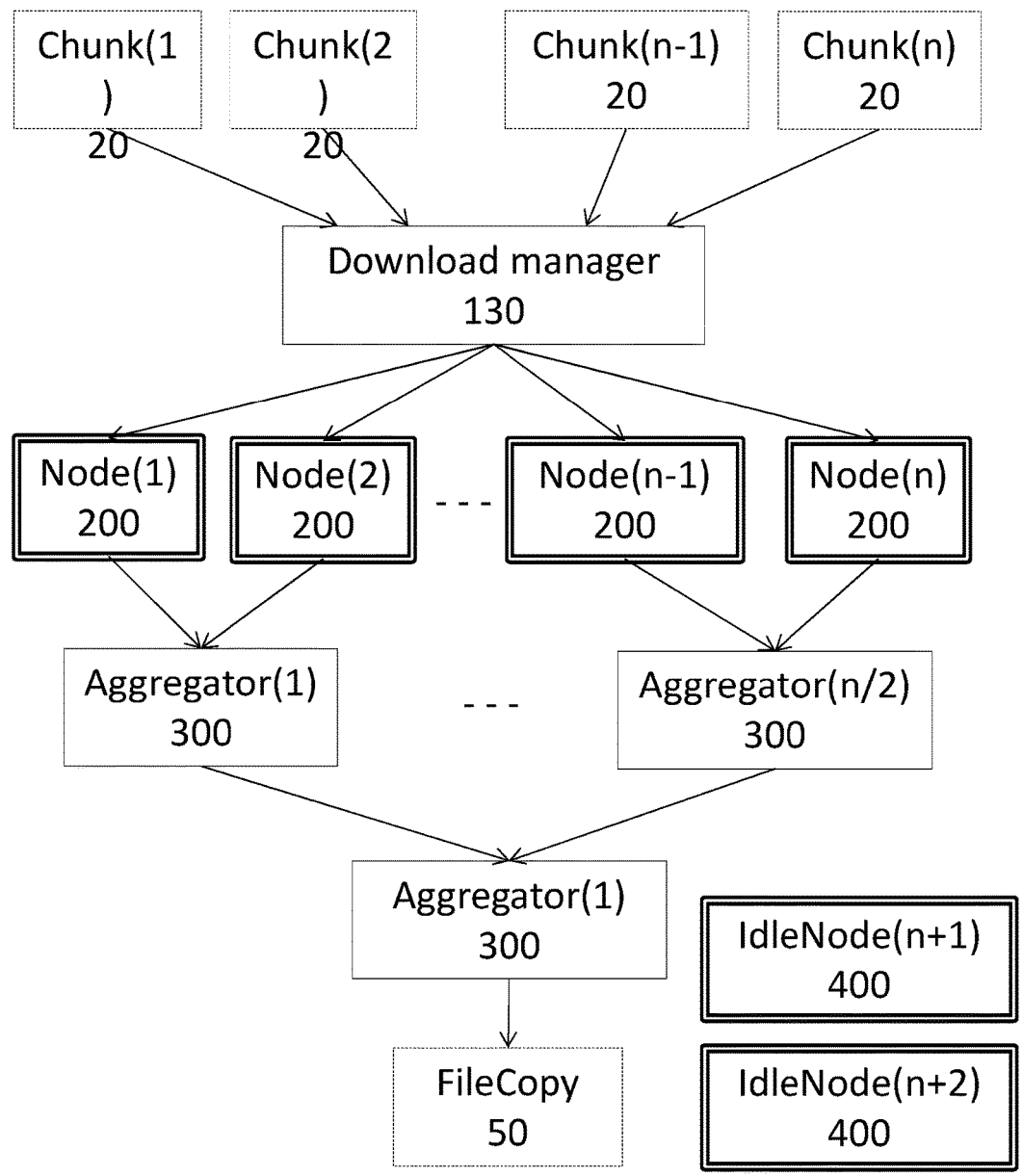
FIG. 4 provides a flowchart showing the process of downloading the plurality of data chunks and converting to a copy of the coherent set of data according to an embodiment of the invention.

With reference to FIG. 4, there is provided a flowchart showing the process of downloading the plurality of data chunks and converting to a copy of the coherent set of data. Data chunks 20 are distributed among nodes 200 via download manager 130 and the segment distributor (not shown) of the master node. Data from each pair of nodes 200 are sent to a common aggregator node 300. Such aggregators are first-level aggregators. Data from the first-level aggregators are sent to another aggregator 300, this being a second level aggregator. In the Figure, second level aggregator 300 has a complete copy of the file, shown as FileCopy 50. Idle nodes 400 remain unused unless called upon to substitute for a node that drops from the network or otherwise becomes unsuitable. In any case, idle nodes 400, aggregator nodes 300, nodes 200, and the master node receive a copy of FileCopy 50 from the aggregator node 300.

Figure 5:
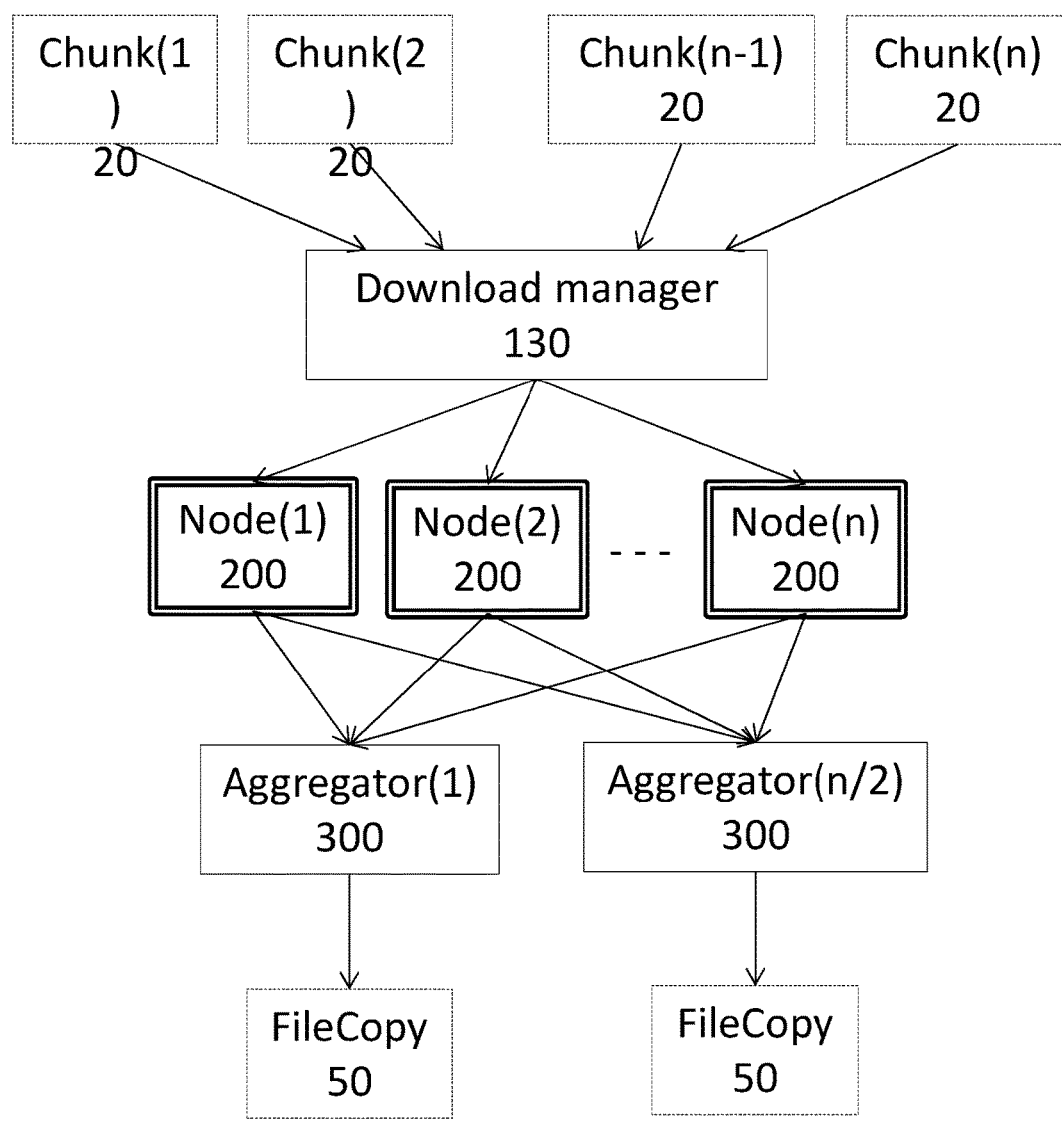
FIG. 5 provides a flowchart showing the process of downloading the plurality of data chunks and converting to copies of the coherent set of data according to an embodiment of the invention.

With reference to FIG. 5, there is provided a flowchart showing an alternative process of downloading the plurality of data chunks and converting to copies of the coherent set of data. In contrast with FIG. 4, only one level of aggregator nodes is present, and each aggregator node 300 communicates with all downloader nodes 200 in order to reconstruct FileCopy 50. Each Aggregator node 300 reconstructs a separate FileCopy 50.

Figure 6:
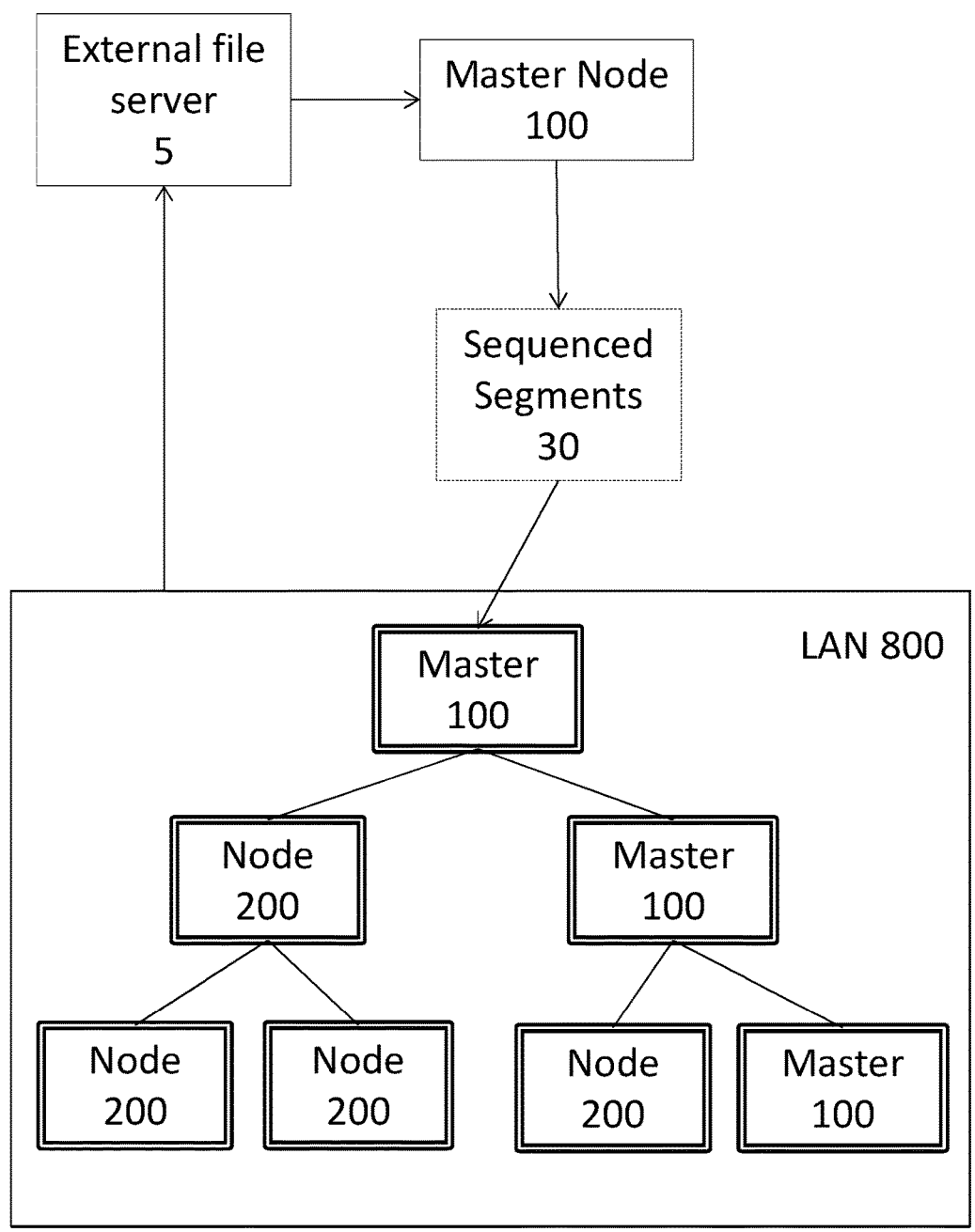
FIG. 6 provides a flowchart showing the architecture of nodes according to an embodiment of the invention.

With reference to FIG. 6, there is provided a flowchart showing the architecture of nodes. Master node 100 and downloading nodes 200 are part of a LAN (i.e., an ad-hoc network). In the figure, four downloading nodes 200 are present and the tree-structure shows that master node 100 operates at multiple levels of the tree. Sequenced segments 30 are prepared by the chunker 110 and distributed to the nodes via segment distributor 120 (both not shown).

Throughout this disclosure, use of the term "server" is meant to include any computer system containing a processor and memory, and capable of containing or accessing computer instructions suitable for instructing the processor to carry out any desired steps. The server may be a traditional server, a desktop computer, a laptop, or in some cases and where appropriate, a tablet or mobile phone. The server may also be a virtual server, wherein the processor and memory are cloud-based.

The methods and devices described herein include a memory coupled to the processor. Herein, the memory is a computer-readable non-transitory storage medium or media, which may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Throughout this disclosure, use of the term "or" is inclusive and not exclusive, unless otherwise indicated expressly or by context. Therefore, herein, "A or B" means "A, B, or both," unless expressly indicated otherwise or indicated otherwise by context. Moreover, "and" is both joint and several, unless otherwise indicated expressly or by context. Therefore, herein, "A and B" means "A and B, jointly or severally," unless expressly indicated otherwise or indicated otherwise by context.

It is to be understood that while the invention has been described in conjunction with examples of specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains. The pertinent parts of all publications mentioned herein are incorporated by reference. All combinations of the embodiments described herein are intended to be part of the invention, as if such combinations had been laboriously set forth in this disclosure.

EXAMPLES

In an example, the focus was on a case where there is a group of mobile/tablet devices trying to download the same content under resource constrained settings. The example might be a school that has recently adopted a tablet/mobile-based blended learning system.

Real Scenario Parameters:

Task: Downloading a video of 100 MB in a Grade 5 Science Class consisting of 27 students, each with a networked device. Each student is required to download the learning materials for the classroom.

Network: Data bundle and School WiFi.

Average download time: 5 minutes per download of the content.

Allocated teaching time: 35 Minutes.

Teaching time loss: (N−1)*5, where N is the number of contents to be downloaded, N>1.

In this scenario, the problem is to collaboratively download content efficiently and distribute it amongst all the users while ensuring better user experience, thereby reducing teaching time loss.

A system according to the disclosure is designed and implemented using the student devices as nodes. The challenges overcome are: dynamically determining and predicting of the resource constrained level of an individual node and measuring its reliability pattern; given the use of low-end devices, determination of how to collaboratively download the same content where nodes can easily run under resource limitation; intelligent allocation of downloading task given each node's current state of available resources (e.g., battery power, bandwidth, etc.) and nodes' predicted reliability index.

As with this educational scenario, the methods described herein can be generalized to other domains and applications where there is need to download a similar content among group members with low-end resource limited devices, e.g., a community or group under the same network such as users in an organization or training and conferences, events, public gathering, DNS servers to localize content, military application, etc.

The invention claimed is:

1. A method for cooperative downloading of data, the method comprising:
    determining the resources available for each node in an interconnected array of nodes;
    dividing a coherent set of data (e.g. content) on a remote device into a plurality of data chunks, wherein the number of data chunks in the plurality of data chunks is equal to or less than the number of nodes in the array of nodes;
    for each data chunk in the plurality of data chunks, assigning the data chunk to a node in the array of nodes, the assignment being based on the determined resources available for the assigned node, wherein each node is assigned either zero or one data chunk, such that the set of nodes assigned a data chunk forms a set of downloading nodes;
    downloading, by each node in the set of downloading nodes, the respective assigned data chunk to form a set of downloaded data chunks;
    selecting from the array of nodes at least one aggregator node, the selection based on the determined resources available for the selected node;
    retrieving, by the aggregator node or nodes, the downloaded data chunks from the set of downloading nodes; and
    recombining, by the aggregator node or nodes, the downloaded data chunks to form a copy of the coherent set of data.

2. The method of claim 1, wherein the determined resources available comprises remaining battery life, available memory, available storage, and available download bandwidth, and past history of the node.

3. The method of claim 1, further comprising identifying the coherent set of data on a remote device, and retrieving metadata pertaining to the coherent set of data.

4. The method of claim 1, further comprising monitoring the resources available for each node in the array of nodes during the downloading of the respective assigned data chunk, and re-assigning a data chunk if a node becomes unsuitable for downloading.

5. The method of claim 1, wherein the dividing the coherent set of data comprises downloading, from the remote device, metadata pertaining to the set of data.

6. The method of claim 1, further comprising selecting from the array of nodes a master node and configuring the master node to coordinate the downloading and aggregator nodes.

7. The method of claim 1, wherein a plurality of nodes are selected as aggregator nodes, and wherein each aggregator node retrieves downloaded data chunks from the set of downloading nodes.

8. The method of claim 1, wherein, prior to determining the resources available for each node in the array of nodes, one node from the array of nodes identifies the coherent set of data on the remote device.

9. The method of claim 1, wherein the downloading nodes are selected based on available download bandwidth and remaining battery life, and the aggregator node or nodes are selected based on remaining battery life and available memory.

10. The method of claim 1, further comprising analyzing the determined resources for a node in the array of nodes to generate a reliability index indicative of the reliability of the node as a downloader node, aggregator node, or master node.

11. The method of claim 1, further comprising distributing, from the aggregator node or nodes, the copy of the coherent set of data to each node in the array of nodes.

12. The method of claim 1, further comprising displaying, on an interface, the copy of the coherent set of data.

13. A system comprising a plurality of nodes, each node of the plurality of nodes comprising:
 a processor;
 a memory coupled to the processor, the memory configured to store program instructions for instructing the processor to carry out the method of claim 1.

14. The system of claim 13, wherein the plurality of nodes are interconnected via a network.

15. The system of claim 13, wherein the program instruction are configured to instruct one node from the plurality of nodes to act as a master node, wherein selection of the master node is based on the determined resources, and wherein the master node coordinates the downloader and aggregator nodes.

16. A method for cooperative downloading of data, the method comprising:
 identifying, by an initiating node, an array of nodes in communication via a network, the array of nodes comprising the initiating node;
 characterizing the resources available for each node in the array of nodes;
 identifying a single master node from the array of nodes;
 identifying a set of downloading nodes from the array of nodes;
 identifying an aggregator node or nodes from the array of nodes;
 for each downloading node in the array of nodes, assigning either zero or one data chunk from a coherent set of data chunks residing on a remote device;
 downloading, by the set of downloading nodes, the assigned data chunks from the remote device; and
 aggregating, by the aggregator node, the downloaded data chunks to form a copy of the coherent set of data.

17. The method of claim 16, wherein the downloading nodes and the aggregator node or nodes are identified by the master node.

18. The method of claim 16, further comprising a recruitment algorithm that continuously monitors the resources available to the downloading nodes and aggregator node or nodes, dynamically allocates data chunks to downloading nodes based on the determined resources available, and dynamically assigns aggregator tasks based on the determined resources available.

19. A method for cooperative downloading of data, the method comprising:
 identifying, by an initiating node, an array of nodes in communication via a network, the array of nodes comprising the initiating node;
 for each node in the array of nodes, characterizing the promise index for the node, wherein the promise index is a function of a resource index based on the instantaneous resources available to the node and a reliability index based on the historical log of the node;
 identifying, based on the resource, reliability, and promise indices, a set of downloading nodes from the array of nodes;
 identifying, based on the resource, reliability, and promise indices, an aggregator node or nodes from the array of nodes;
 for each downloading node in the array of nodes, assigning either zero or one data chunk from a coherent set of data chunks residing on a remote device;
 downloading, by the set of downloading nodes, the assigned data chunks from the remote device;
 aggregating, by the aggregator node, the downloaded data chunks to form a copy of the coherent set of data; and
 displaying the copy of the coherent set of data on a display associated with the initiating node.

20. The method of claim 19, further comprising dynamically monitoring the resource, reliability, and promise indices for each node in the array of nodes, and dynamically assigning download and aggregator tasks based on the monitored indices.

* * * * *